United States Patent [19]

Okada et al.

[11] Patent Number: 5,235,664
[45] Date of Patent: Aug. 10, 1993

[54] APPARATUS FOR INSERTING OPTICAL CABLE INTO FERRULE

[75] Inventors: Kinjiro Okada; Hiromasa Shiraishi, both of Tokyo; Hirokazu Yokosawa, Nagano; Shinichi Takehana, Nagano; Norio Kobayashi, Nagano, all of Japan

[73] Assignee: Hirose Electric Co., Ltd., Tokyo, Japan

[21] Appl. No.: 886,357

[22] Filed: May 21, 1992

[30] Foreign Application Priority Data

May 22, 1991 [JP] Japan .................................. 3-145246

[51] Int. Cl.⁵ .................................................. G02B 6/36
[52] U.S. Cl. .................................... 385/134; 385/137; 385/60
[58] Field of Search ............... 385/134, 137, 60, 72, 385/78, 85, 33, 53; 254/134.4; 362/32; 359/367

[56] References Cited

U.S. PATENT DOCUMENTS 3,938,895  2/1976  Bridger et al. .................. 385/33 X
3,999,841  12/1976  Dakss et al. ..................... 385/53
4,678,271  7/1987  Beaulieu ......................... 385/134

Primary Examiner—John D. Lee
Assistant Examiner—Phan T. Heartney
Attorney, Agent, or Firm—Kanesaka & Takeuchi

[57] ABSTRACT

An apparatus for inserting an optical cable into a ferrule which has a cable housing aperture and a fiber retention aperture connected to the cable housing aperture via a tapered section, which includes a cable holder (2) for holding an optical cable (1) from which a length of cable jacket is removed to expose an optical fiber (1B); a ferrule holder (5) for holding a ferrule (F) such that a cable housing aperture (F1) and a fiber retention aperture (F3) are aligned in an extension line of the optical cable; a guiding unit (4) disposed in front of the ferrule holder and having a pair of guiding members (41A, 41B) to form a guiding aperture (43) with a diameter slightly larger than that of the fiber retention aperture; the guiding members movable sideways so that the ferrule holder brings the ferrule close to the cable holder, thereby inserting the optical cable into the ferrule.

8 Claims, 5 Drawing Sheets

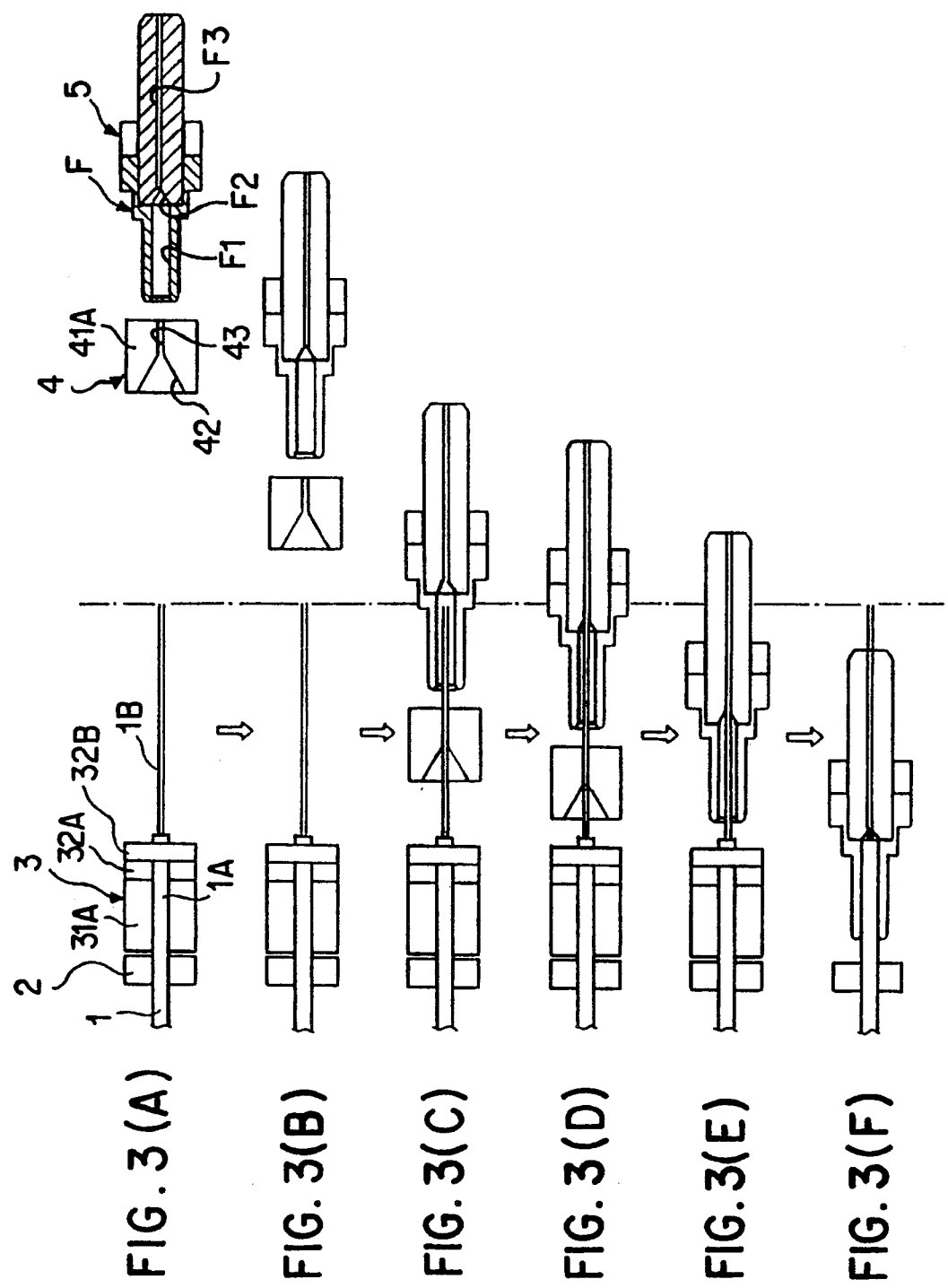

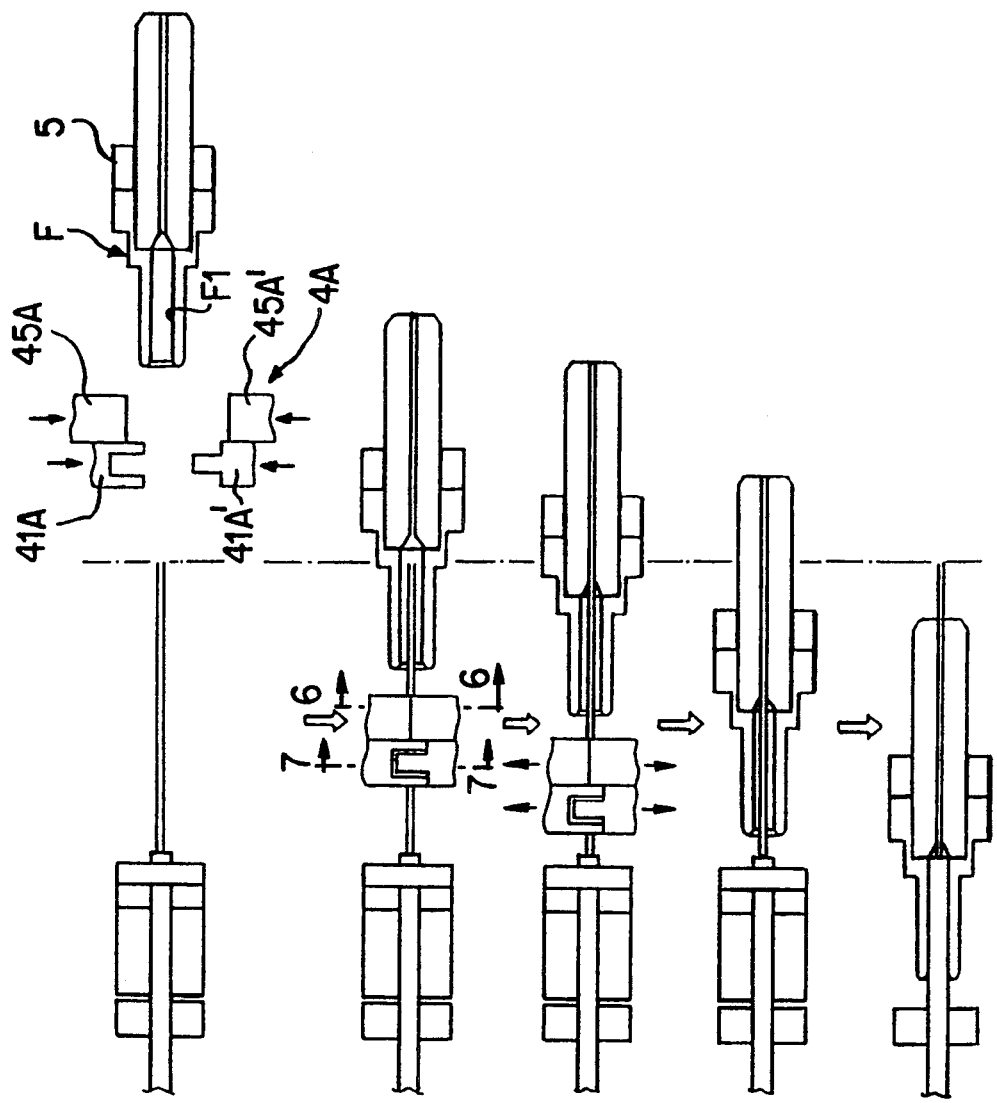

APPARATUS FOR INSERTING OPTICAL CABLE INTO FERRULE

BACKGROUND OF THE INVENTION

1. Field of the Invention

The present invention relates to apparatus for inserting an optical cable into a ferrule.

2. Description of the Prior Art

When optical cables are used, the cable jackets are removed, and the exposed optical fibers are inserted into ferrules. The ferrules have a cable housing aperture in the front portion and a fiber retention aperture in the rear portion. The cable housing apertures have a diameter substantially equal to that of the cable jackets of optical cables so as to receive them. The fiber retention apertures have a diameter substantially equal to that of optical fibers so as to hold them. The housing and retention apertures are connected via a tapered section. Optical fibers are inserted into ferrules through the housing apertures and guided by the tapered section into the retention apertures.

However, upon abutment against the tapered section, some optical fibers do not slide along the tapered surfaces but break up under thrusts.

Japanese Patent Application Kokai No. 63-231409 discloses a control system which includes a sensor for detecting thrusts on optical fibers in order to keep the thrusts below predetermined levels.

However, it is not useful to control the thrusts categorically because all optical fibers are different in flexibility even for optical cables of the same kind. Thus, it is necessary to control a thrust for each optical fiber. However, such control devices are very complex and very expensive.

SUMMARY OF THE INVENTION

Accordingly, it is an object of the invention to provide an apparatus for inserting an optical cable into a ferrule, which permits categorical control of thrusts for all cables of the same kind.

It is another object of the invention to provide apparatus for inserting an optical cable into a ferrule, which has a simple structure.

According to the invention there is provided an apparatus for inserting an optical cable into a ferrule which has a cable housing aperture and a fiber retention aperture connected to the cable housing aperture via a tapered section, which includes a cable holder for holding an optical cable from which a length of cable jacket is removed to expose an optical fiber; a ferrule holder for holding a ferrule such that a cable housing aperture and a fiber retention aperture are aligned in an extension line of the optical cable; a guiding unit disposed in front of the ferrule holder and having a pair of guiding members to form a guiding aperture with a diameter slightly larger than that of the fiber retention aperture; the guiding members movable sideways so that the ferrule holder brings the ferrule close to the cable holder, thereby inserting the optical cable into the ferrule.

According to another aspect of the invention a ferrule is mounted on an optical fiber as follows:

In Step 1, an optical cable, from which a length of cable jacket is removed to expose an optical fiber, is held by the cable holder.

In Step 2, the ferrule holder and the guiding unit are advanced toward the optical fiber so that the optical fiber projects from the guiding aperture of the guiding unit without deflection.

In Step 3, as the guiding unit and the ferrule holder are advanced, the optical fiber is guided by the guiding unit and thrusted into the retention aperture of the ferrule without difficulty.

In Step 4, the guiding unit is separated away so that the ferrule holder is further advanced until the cable jacket is fully placed in the cable housing aperture.

In Step 5, the optical cable is removed from the cable holder ready for subsequent processes.

The above and other objects, features, and advantages of the invention will be apparent from the following description when taken in conjunction with the accompanying drawings.

BRIEF DESCRIPTION OF THE DRAWINGS

FIGS. 3A-3F show how the cable insertion machine works;

FIGS. 5A-5E show how a guiding unit according to still another embodiment works;

DESCRIPTION OF THE PREFERRED EMBODIMENT

Figure 1:
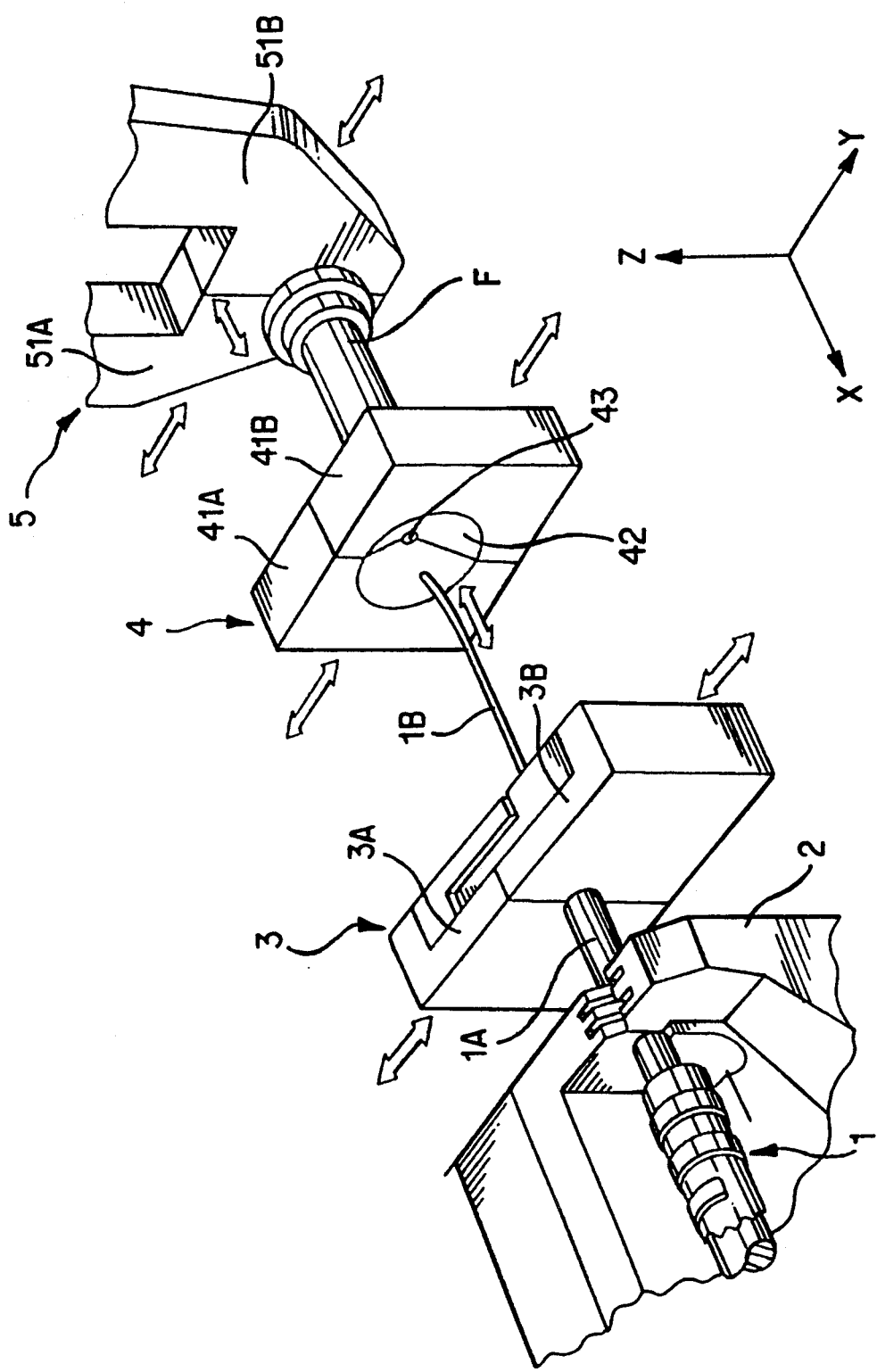
FIG. 1 is a perspective view of a cable insertion machine according to an embodiment of the invention.

In FIG. 1, an optical cable 1, which is composed of at least one layer of cable jacket 1A and a core optical fiber 1B, is held along the X axis by a pair of clamp members 2 which are movable along the Y axis. One of the clamp member 2 has a recess which extends along the X axis and has a depth slightly smaller than that of the cable jacket 1A so as to avoid damage to the optical cable 1. A cable positioner 3, a guiding unit 4, and a ferrule holder 5 are arranged coaxially with the clamp members 2.

Figure 2:
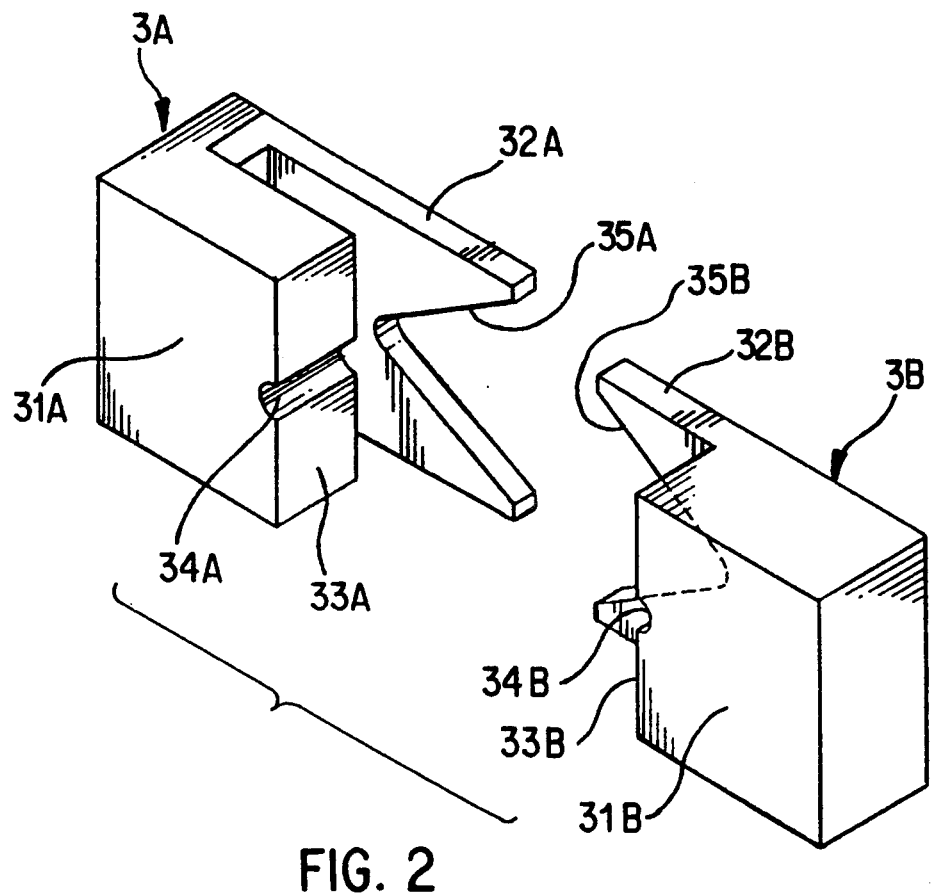
FIG. 2 is a perspective view of a cable positioner for the cable insertion machine.

In FIG. 2, the cable positioner 3 is composed of a pair of position members 3A and 3B which are movable along the Y axis. Each position member 3A (3B) is composed of a substantially rectangular block member 31A (31B) and a plate member 32A (32B) which has a V-shaped notch 35A (35B). The position member 3A has a recess between the block member 31A and the plate member 32A for receiving the mating plate member 32B. Each block member 31A (31B) has an abutting face 33A (33B) which has a semi-circular groove 34A (34B) for holding the cable jacket 1A when the block members 31A and 31B are brought together. The semi-circular grooves 34A and 34B are made so as to gently hold the cable jacket 1A for positioning. The plate members 32A and 32B are offset along the X axis so as to slide on each other when the positioning members 3A and 3B are brought together. The valley of each V-shaped notch 35A (35B) is rounded so as to form a circle similar to that of the semi-circular grooves 34A and 34B when the abutting faces 33A and 33B are brought into abutment.

In FIG. 1, the guiding unit 4 is composed of a pair of guide members 41A and 41B which are movable along the Y axis. The guide members 41A and 41B are also movable along the X axis after they are brought together. Each guide member 41A (41B) has a semi-circular tapered guiding section 42 and a semi-circular guiding aperture 43 having a diameter slightly larger than that of the optical fiber when the guiding members 41A and 41B are joined together.

The ferrule holder 5 has a pair of finger members 51A and 51B movable along the Y axis. Each finger member 51A (51B) has a semi-circular groove on the abutment face for holding a ferrule F. The finger members 51A and 51B are movable along the X axis upon abutment.

In FIG. 3, in the step A, an optical cable 1, from which a length of cable jacket is removed to expose an optical fiber 1B, is held by the cable holder 2 on the cable jacket 1A. Then, as the positioning members 3A and 3B are brought together, the rectangular space formed by the V-shaped notches 35A and 35B decreases so that the optical cable 1A is positioned by the grooves 34A and 34B on the block members 31A and 31B. The length of the cable positioner 3 along the X axis is set sufficiently large to correct any sag or flexure of optical cables. The ferrule F is held by the ferrule holder 5 such that the cable housing aperture F1 is directed to the optical fiber 1B.

In the step (B), the guiding unit 4 and the ferrule holder 5 are advanced along the X axis.

In the step (C), the optical fiber 1B is guided by the tapered section 42 of the guiding unit 4 into the guiding aperture 43. Since the diameter of the guiding aperture 43 is set slightly larger than that of the optical fiber 1B, the optical fiber 1B passes through the guiding aperture 43 without difficulty. Thus, the optical fiber 1B is positioned precisely in place by the guiding aperture 43, and any deflection is corrected.

In the step (D), the optical fiber 1B passes through the cable housing aperture F1 of the ferrule F behind the guiding unit 4 and is guided by the tapered section F2 into the retention aperture F3. Since the optical fiber 1B is positioned precisely in the above step (C), it is easy to insert the optical fiber 1B into the retention aperture F3.

In the step (E), the guiding members 41A and 41B are removed, and the ferrule F is further advanced.

In the step (F), the positioning members 31A and 31B are removed, and the ferrule F is more advanced so that the cable jacket is housed in the cable housing aperture F1. Finally, the optical cable is removed from the cable holder 2.

As has been described above, the optical fiber is inserted into the ferrule in a streamlined process.

Figure 4:
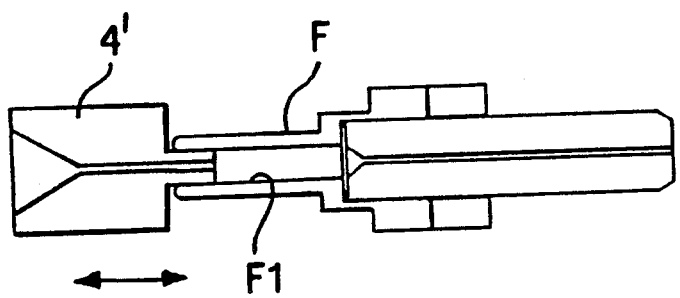
FIG. 4 is a longitudinal section of a guiding unit according to another embodiment of the invention.

In FIG. 4, a guiding device 4' has projected portions which form a cylindrical portion when the guiding members are put together. The cylindrical portion fits into the cable housing aperture F1 of a ferrule F, assuring more precise positioning of the optical fiber.

Figure 6:
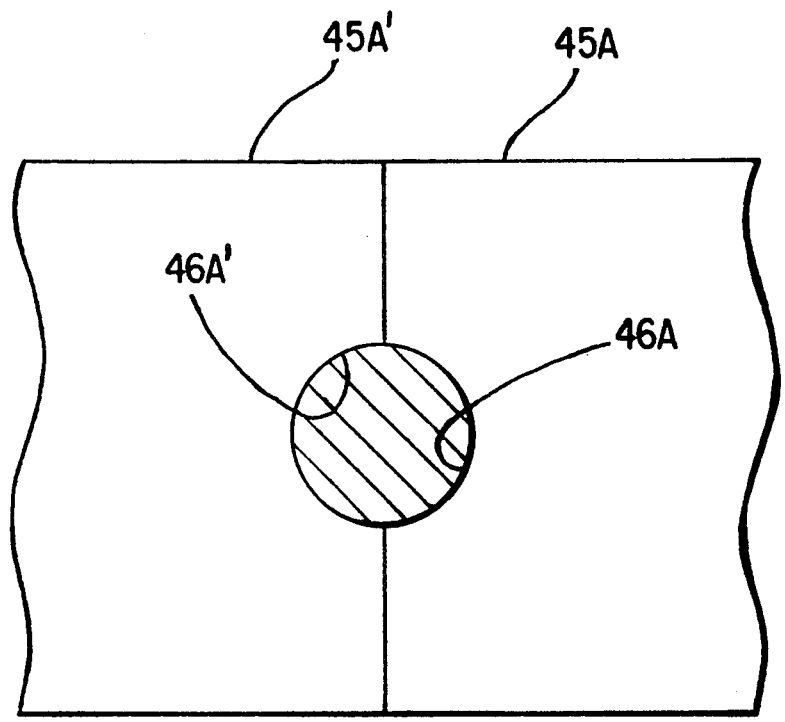
FIG. 6 is a sectional view taken along 6—6 of FIG. 5.
Figure 7:
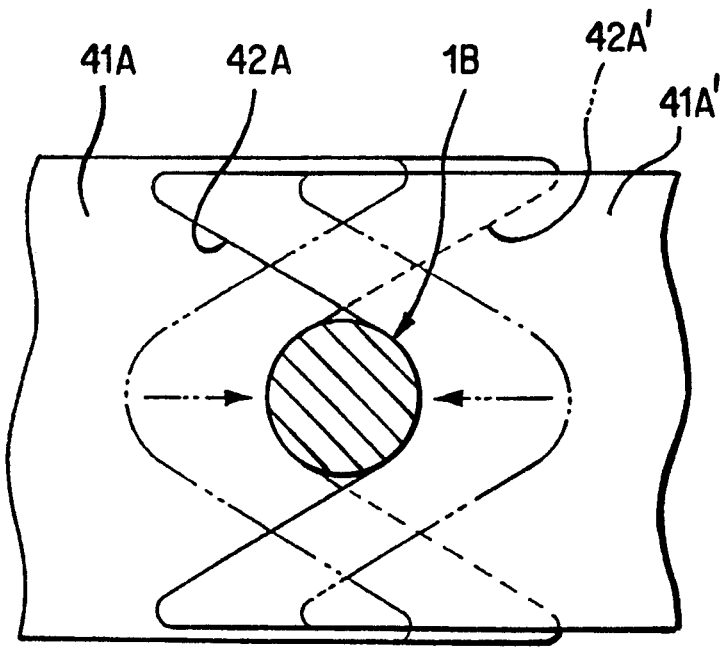
FIG. 7 is a sectional view taken along 7—7 of FIG. 5.

In FIGS. 5-7, a guiding unit 4A is similar in structure to the cable positioner 3. That is, it is composed of a pair of guiding plates 41A and 41A' having a V-shaped notch 42A (42A') and a pair of guiding blocks 45A and 45A' having a semi-circular groove 46A (46A').

In the step (A) of FIG. 5, the cable jacket 1A is held by the cable holder 2 and the cable positioner 3 to reduce the flexion or deflection of the optical fiber 1B. At this time, the guiding members 45A and 45A' are separated.

In the step (B), the guiding unit 4A and the ferrule holder 5 are advanced along the X axis so that the optical fiber 1B is inserted in the cable housing aperture F1. In order to reduce the flexion or deflection of the optical fiber 1B, the guiding plates 41A and 41A' are brought together to form a rhombic space in which the optical fiber B1 housed (FIG. 7). As the guiding plates 41A and 41A' are advanced, the rhombic space decreases to bring the optical fiber B1 into place. Then, the guiding blocks 45A and 45A' are brought into abutment to each other to house the optical fiber 1B in the guiding grooves 46A and 46A' (FIG. 6). Thus, the deflection of the optical fiber 1B is further reduced so that it is easier to insert the optical fiber into the retention aperture 3 of a ferrule F than before. The subsequent steps are the same as the above steps (D) and (F) of FIG. 3, and the description will be omitted.

As has been described above, an optical fiber is guided by the guiding unit into a ferrule so precisely that it is easy to insert the optical fiber into the ferrule. Thus, it is possible to not only eliminate complex control systems but insert optical fibers into ferrules without break. Preferably, a ferrule is advanced in reciprocating fashion to facilitate the insertion of an optical fiber into the ferrule.

We claim:

1. An apparatus for inserting an optical cable into a ferrule which has a cable housing aperture for housing a cable jacket of said optical cable and a fiber retention aperture for holding an optical fiber of said optical cable, said fiber retention aperture being connected to the cable housing aperture via a tapered section, comprising:
   a cable holder for holding an optical cable at a distance from an end of a cable jacket of said optical cable, said distance being longer than a said cable housing aperture;
   a ferrule holder for holding a ferrule such that a cable housing aperture and a fiber retention aperture are aligned in an extension line of said optical cable, said ferrule holder being movable in an axial direction of said optical cable toward said cable holder;
   a guiding unit disposed in front of said ferrule holder and having a pair of guiding member to form a guiding aperture with a diameter slightly larger than that of said fiber retention aperture thereby permitting sliding movement of said optical fiber through said guiding aperture;
   said guiding members being movable sideways permitting said ferrule holder to bring said ferrule close to said cable holder, thereby inserting said optical cable into said cable housing aperture of said ferrule.

2. The apparatus of claim 1, wherein said ferrule holder is advanced in reciprocating motion after a rear end of said cable housing aperture passes a front end of said optical fiber.

3. The apparatus of claim 1, wherein said guiding members have a tapered section which communicates with said guiding aperture.

4. The apparatus of claim 1, wherein said guiding unit is movable together with said ferrule holder in said axial direction toward said cable holder.

5. The apparatus of claim 1, wherein said guiding unit is provided with a cylindrical projection for fit into said cable housing aperture of said ferrule, thereby assuring more precise positioning of said optical fiber.

6. The apparatus of claim 1, which further comprises a cable positioner disposed between said guiding unit and said cable holder and having in said extension line a positioning aperture with a diameter slightly larger than that of said jacket portion for holding said jacket portion, thereby preventing sagging of said optical cable.

7. The apparatus of claim 6, wherein said cable positioner comprises a pair of position members which are movable sideways for permitting said ferrule holder to bring said ferrule through said cable positioner to said cable holder so that said optical fiber is housed in said fiber retention aperture of said ferrule.

8. An apparatus for inserting an optical cable into a ferrule which has a cable housing aperture and a fiber retention aperture connected to the cable housing aperture via a tapered section, comprising:
- a cable holder for holding an optical cable from which a length of cable jacket is removed to expose an optical fiber;
- a ferrule holder for holding a ferrule such that a cable housing aperture and a fiber retention aperture are aligned in an extension line of said optical cable;
- a guiding unit disposed in front of said ferrule holder and having a pair of guiding members to form a guiding aperture with a diameter slightly larger than that of said fiber retention aperture;
- said guiding members movable sideways so that said ferrule holder brings said ferrule close to said cable holder, thereby inserting said optical cable into said ferrule,
- said guiding unit comprising a pair of guiding plates and a pair of guiding blocks behind said guiding plates,
- said guiding plates having a V-shaped notch and being movable relative to each other to form a variable aperture, and
- said guiding blocks each having a semi-circular guiding groove on an abutment face and being movable relative to each other to form a guiding aperture having a radius substantially equal to that of an optical fiber.

* * * * *